US012651137B2

(12) United States Patent (10) Patent No.: US 12,651,137 B2
Luke et al. (45) Date of Patent: Jun. 9, 2026

(54) MACHINE LEARNING MODEL TO PROVIDE PREDICTED PRINT MATERIAL USAGE CORRECTION FACTOR

(71) Applicant: Hewlett-Packard Development Company, L.P., Spring, TX (US)

(72) Inventors: Jeffrey H Luke, Boise, ID (US); Gabriel S McDaniel, Boise, ID (US); Scott K Hymas, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 420 days.

(21) Appl. No.: 18/023,368

(22) PCT Filed: Sep. 22, 2020

(86) PCT No.: PCT/US2020/052011
§ 371 (c)(1),
(2) Date: Feb. 26, 2023

(87) PCT Pub. No.: WO2022/066144
PCT Pub. Date: Mar. 31, 2022

(65) Prior Publication Data
US 2023/0305525 A1 Sep. 28, 2023

(51) Int. Cl.
*G06K 15/00* (2006.01)
*G06N 20/00* (2019.01)

(52) U.S. Cl.
CPC ......... *G06K 15/4075* (2013.01); *G06N 20/00* (2019.01); *G05B 2219/49023* (2013.01)

(58) Field of Classification Search
CPC ...... G05B 19/4099; G05B 2219/49023; G05B 2219/4902; G06N 20/00; B41J 2002/17569; B41J 2/17566; B41J 2/00; G06F 3/121; G06F 3/1229; G06F 3/1285; G06F 3/12; G06K 15/40; G06K 15/4075; G01F 23/00
USPC ....................................................... 700/118
See application file for complete search history.

(56) References Cited

U.S. PATENT DOCUMENTS

| | | | |
|---|---|---|---|
| 5,937,225 A | 8/1999 | Samuels | |
| 6,969,139 B2 | 11/2005 | Lapstun et al. | |
| 7,085,503 B2 | 8/2006 | Mokuya | |
| 8,047,626 B1 * | 11/2011 | Derhak .............. | G06Q 30/0283 |
| | | | 358/1.15 |
| 9,134,675 B2 | 9/2015 | Yang et al. | |

(Continued)

FOREIGN PATENT DOCUMENTS

| | | | | |
|---|---|---|---|---|
| KR | 20200049096 A | * | 5/2020 | .......... B41J 2/17566 |
| RU | 2444784 C2 | | 3/2012 | |
| WO | 2019/047355 A1 | | 3/2019 | |

*Primary Examiner* — Kamini S Shah
*Assistant Examiner* — Michael V Farina
(74) *Attorney, Agent, or Firm* — Michael Dryja

(57) ABSTRACT
A machine learning model provides a correction factor to predicted print material usage on a per-print job basis. The machine learning model is trained based on print job information of print jobs printed by printing devices using print material from cartridges received on a per-print job basis, and based on predicted print material usage by the printing devices in printing the print jobs received on a per-print job basis. The machine learning model is further trained based on measured actual remaining print material within the cartridges after the cartridges have been replaced within the printing devices by new cartridges.

9 Claims, 7 Drawing Sheets

(56)         References Cited

U.S. PATENT DOCUMENTS

|  |  |  |  |
|---|---|---|---|
| 9,606,488 B1 * | 3/2017 | Leute ................. | G03G 15/0894 |
| 9,661,163 B1 | 5/2017 | Shin et al. | |
| 10,658,666 B2 | 5/2020 | Osadchyy | |
| 10,776,676 B1 * | 9/2020 | Fukaya .............. | H04N 1/00034 |
| 2003/0043401 A1 | 3/2003 | Abel et al. | |
| 2013/0101328 A1 * | 4/2013 | Morovic ............ | H04N 1/00005 |
| | | | 400/76 |
| 2015/0003847 A1 * | 1/2015 | Yang ................... | G03G 15/556 |
| | | | 399/27 |
| 2016/0109825 A1 * | 4/2016 | Webb .................. | G03G 15/556 |
| | | | 399/61 |
| 2016/0236478 A1 * | 8/2016 | Carnelli ................... | B41J 2/175 |
| 2018/0147838 A1 * | 5/2018 | Harayama .............. | B33Y 50/02 |
| 2020/0041943 A1 * | 2/2020 | Osadchyy .......... | G03G 15/5079 |
| 2020/0064767 A1 | 2/2020 | Daque et al. | |
| 2020/0234095 A1 * | 7/2020 | Nakane ............... | G06K 15/005 |
| 2021/0216030 A1 * | 7/2021 | Park .................. | G03G 15/0856 |

* cited by examiner

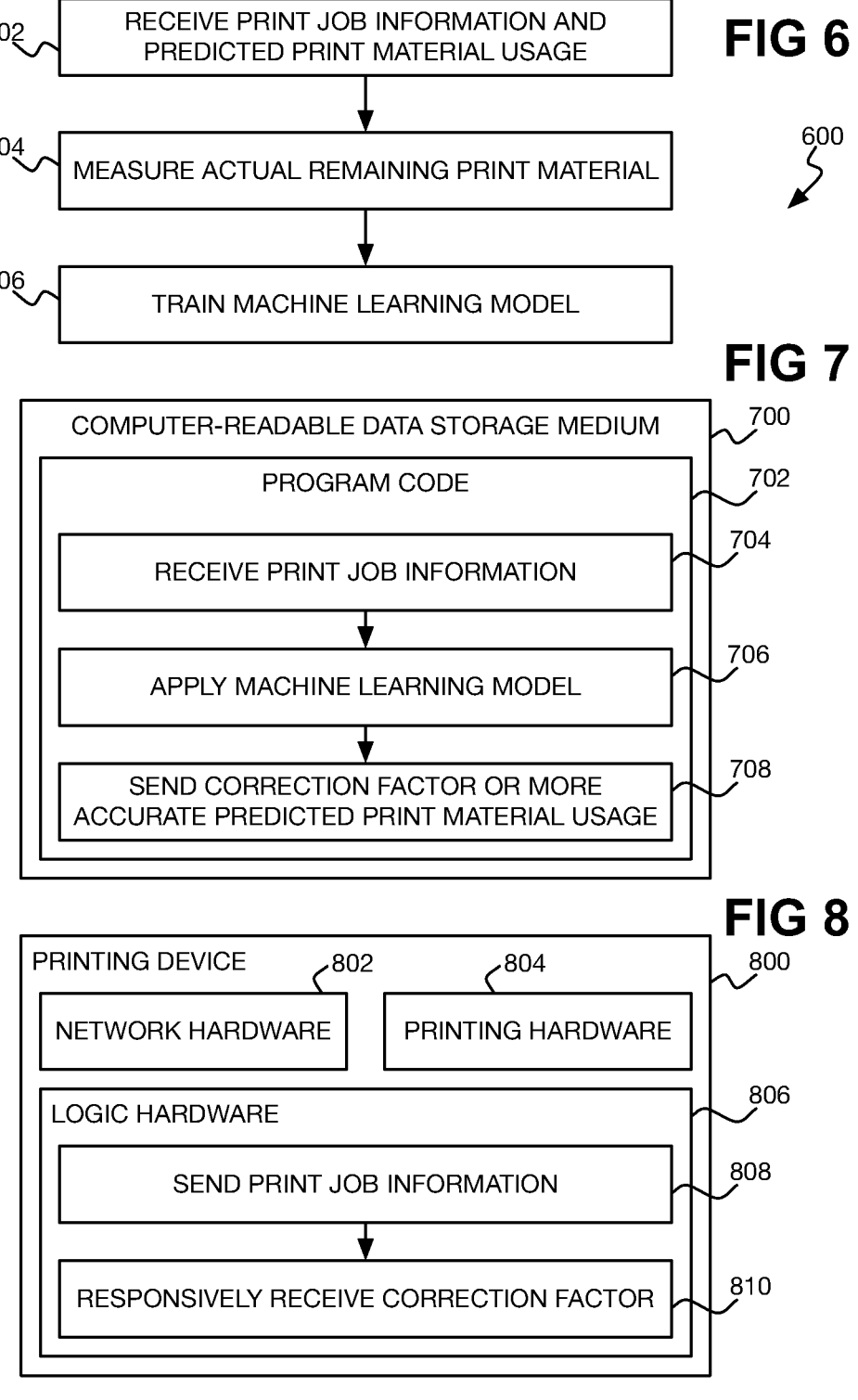

FIG 6

602 — RECEIVE PRINT JOB INFORMATION AND PREDICTED PRINT MATERIAL USAGE

600

604 — MEASURE ACTUAL REMAINING PRINT MATERIAL

606 — TRAIN MACHINE LEARNING MODEL

FIG 7

COMPUTER-READABLE DATA STORAGE MEDIUM — 700

PROGRAM CODE — 702

RECEIVE PRINT JOB INFORMATION — 704

APPLY MACHINE LEARNING MODEL — 706

SEND CORRECTION FACTOR OR MORE ACCURATE PREDICTED PRINT MATERIAL USAGE — 708

FIG 8

PRINTING DEVICE — 800

NETWORK HARDWARE — 802

PRINTING HARDWARE — 804

LOGIC HARDWARE — 806

SEND PRINT JOB INFORMATION — 808

RESPONSIVELY RECEIVE CORRECTION FACTOR — 810

MACHINE LEARNING MODEL TO PROVIDE PREDICTED PRINT MATERIAL USAGE CORRECTION FACTOR

BACKGROUND

Printing devices can use a variety of different technologies to form images on media such as paper or to build three-dimensional (3D) objects. Such technologies include dry electrophotography (EP) and liquid EP (LEP) technologies, which may be considered as different types of laser and light-emitting diode (LED) printing technologies, as well as inkjet-printing technologies and three-dimensional (3D) printing technologies. Printing devices deposit print material, such as colorant like toner, ink (which can include other printing fluids or material as well), or 3D print material.

BRIEF DESCRIPTION OF THE DRAWINGS

FIG. 6 is a flowchart of an example method.

FIG. 7 is a diagram of an example non-transitory computer-readable data storage medium.

FIG. 8 is a block diagram of an example printing device.

DETAILED DESCRIPTION

As noted in the background, printing devices deposit print material to form images on media or, in the case of three-dimensional (3D) printing devices, to additively build (3D) objects. Printing devices or their print material cartridges may include print material sensors that can directly measure how much print material is being used as print jobs are printed, or that can directly detect when the cartridges are low or empty. Inclusion of such sensors can increase printing device cost and/or increase the cost of replacement print material cartridges like toner and inkjet cartridges. For cost and other reasons, therefore, manufacturers may forego including such sensors within printing devices and/or replacement print material cartridges.

Printing devices may instead indirectly track the remaining print material within their print material cartridges. When a fresh print material cartridge is installed within a printing device, the amount of print material within the cartridge is known. As print jobs are printed, the printing device predict print material usage based on information regarding the print jobs, and accordingly updates the remaining print material within the cartridge by subtracting the predicted print material usage. When the remaining print material is less than a threshold, the printing device may alert the user to order a replacement cartridge, or the device may send a notification over a network for automatic shipment of a replacement cartridge.

Inaccurately tracking the remaining print material within a cartridge can result in erroneous notification that a printing device has depleted the currently installed cartridge. Therefore, the print material cartridge may be prematurely replaced with a replacement cartridge, wasting print material and increasing cost, both monetarily and environmentally. For example, in the situation in which a replacement cartridge is automatically shipped when the printing device sends a notification that the currently installed cartridge is low on print material, the replacement cartridge may be installed within the printing device as soon as it is received, even if the currently installed cartridge has not yet been depleted.

Techniques described herein ameliorate these and other issues. A machine learning model provides a correction factor for a print job that a printing device has printed. The correction factor is applied to the predicted print material usage of the print job to render the predicted usage more accurate. The remaining print material within a cartridge can therefore be more accurately tracked even if the printing device and the supply lack a print material sensor. Premature replacement of the cartridge is also less likely to occur. For example, a replacement cartridge may be automatically shipped closer to when the currently installed cartridge becomes depleted, so that even if the replacement cartridge is installed upon receipt, less print material is wasted.

Figures 1A, 1B, 1C, 1D:
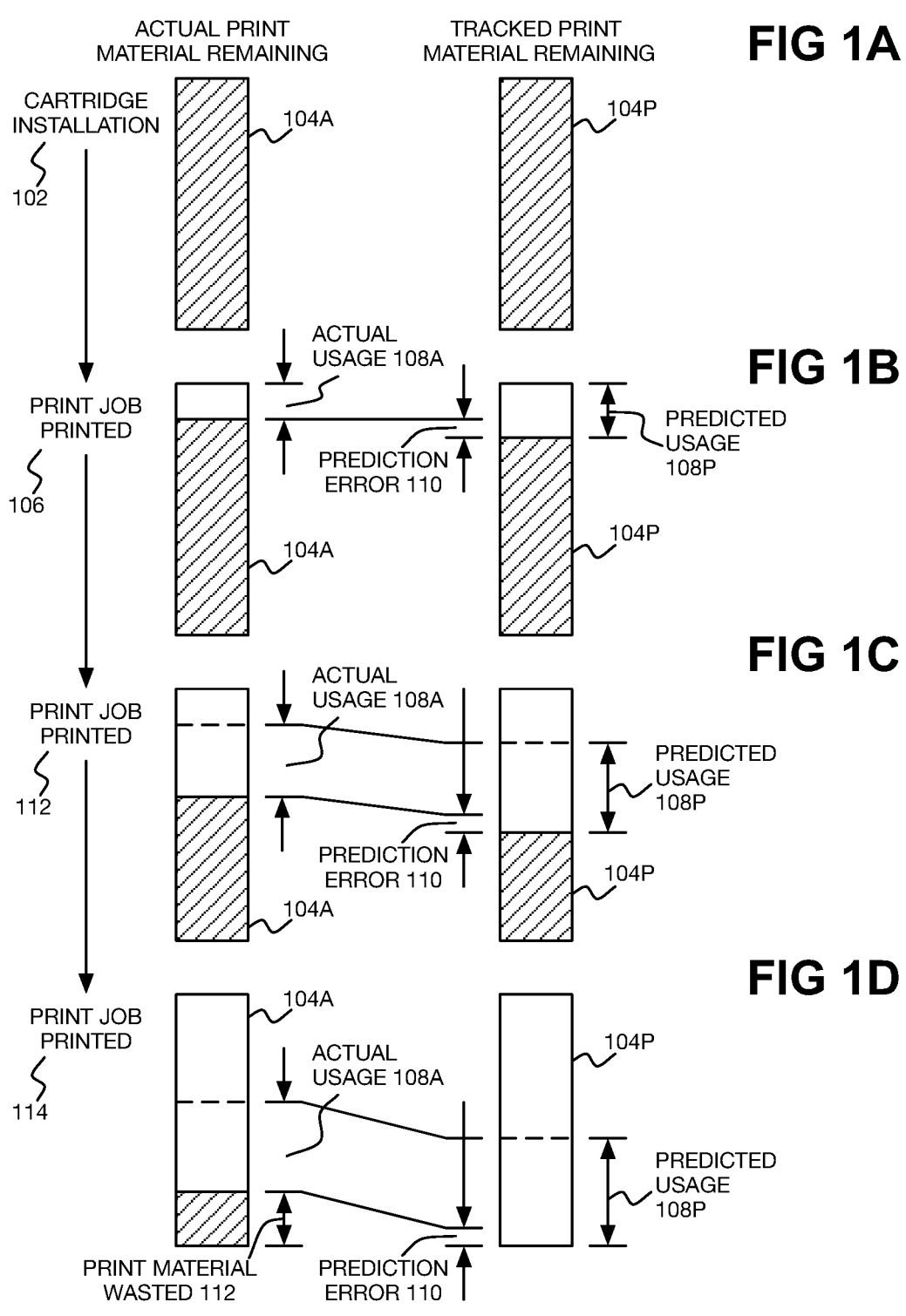
FIGS. 1A, 1B, 1C, and 1D are diagram of an example of actual versus predicted print material remaining within a cartridge as print jobs are printed.

FIGS. 1A, 1B, 1C, and 1D illustrate an example as to how the actual print material remaining within a cartridge of a printing device can differ from the tracked print material remaining within the cartridge. In FIG. 1A, when a new cartridge is installed within the printing device (102), the actual remaining print material 104A in the cartridge may be known, even though the device may be unable to directly measure or monitor the amount of print material 104A in the cartridge. The tracked remaining print material 104P in the cartridge can be set equal to this known amount, and thus initially accurately reflects the actual remaining print material 104A.

In FIG. 1B, once the printing device has printed a print job (106), the actual remaining print material 104A decreases by the actual print material usage 108A of the print job. However, the printing device may not be able to measure the actual usage 108A of print material. The printing device may instead calculate the predicted print material usage 108P of the print job, and accordingly decrease the tracked remaining print material 104P by the predicted usage 108P. The tracked remaining print material 104P does not accurately reflect the actual remaining print material 104A in the cartridge if there is a prediction error 110 between the predicted usage 108P and the actual usage 108A.

The printing device continues to print jobs and accordingly track the tracked remaining print material 104A in the cartridge. For instance, in FIG. 1C, when the printing device has printed another print job (112), the actual remaining print material 104A again decreases by the actual print material usage 108A of the print job. The printing device calculates the predicted print material usage 108P of the print job, and decreases the tracked remaining print material 104P by the predicted usage 108P. If there is again a prediction error 110 between the predicted usage 108P and the actual usage 108A, the gap between the tracked remaining print material 104P and the actual remaining print material 104A in the cartridge may widen.

Similarly, in FIG. 1D, when the printing device has again printed another print job (114), the actual remaining print material 104A decreases by the actual print material usage 108A of the print job as before. The printing device again calculates the predicted print material usage 108P of the print job and decreases the tracked remaining print material 104P by the predicted usage 108P. If there is a prediction error 110 between the predicted usage 108P and the actual usage 108A, the gap between the tracked remaining print material 104P tracked by the printing and the actual remaining print material 104A in the cartridge may widen even further.

In the example, the tracked remaining print material 104P becomes zero after the printing device has printed the print job in FIG. 1D. Prior to this time the printing device may have sent a notification that the cartridge is running low, resulting in reordering of a replacement cartridge. If the cartridge is replaced after the print job has been printed in FIG. 1D, the actual remaining print material 104A in the cartridge is wasted print material 112. A machine learning model can be trained to provide a correction factor to the predicted print material usage 108P of a print job so that the predicted usage 108P more accurately reflects the actual print material usage 108A (i.e., to reduce the prediction error 110 in FIGS. 1A-1D).

Figure 2:
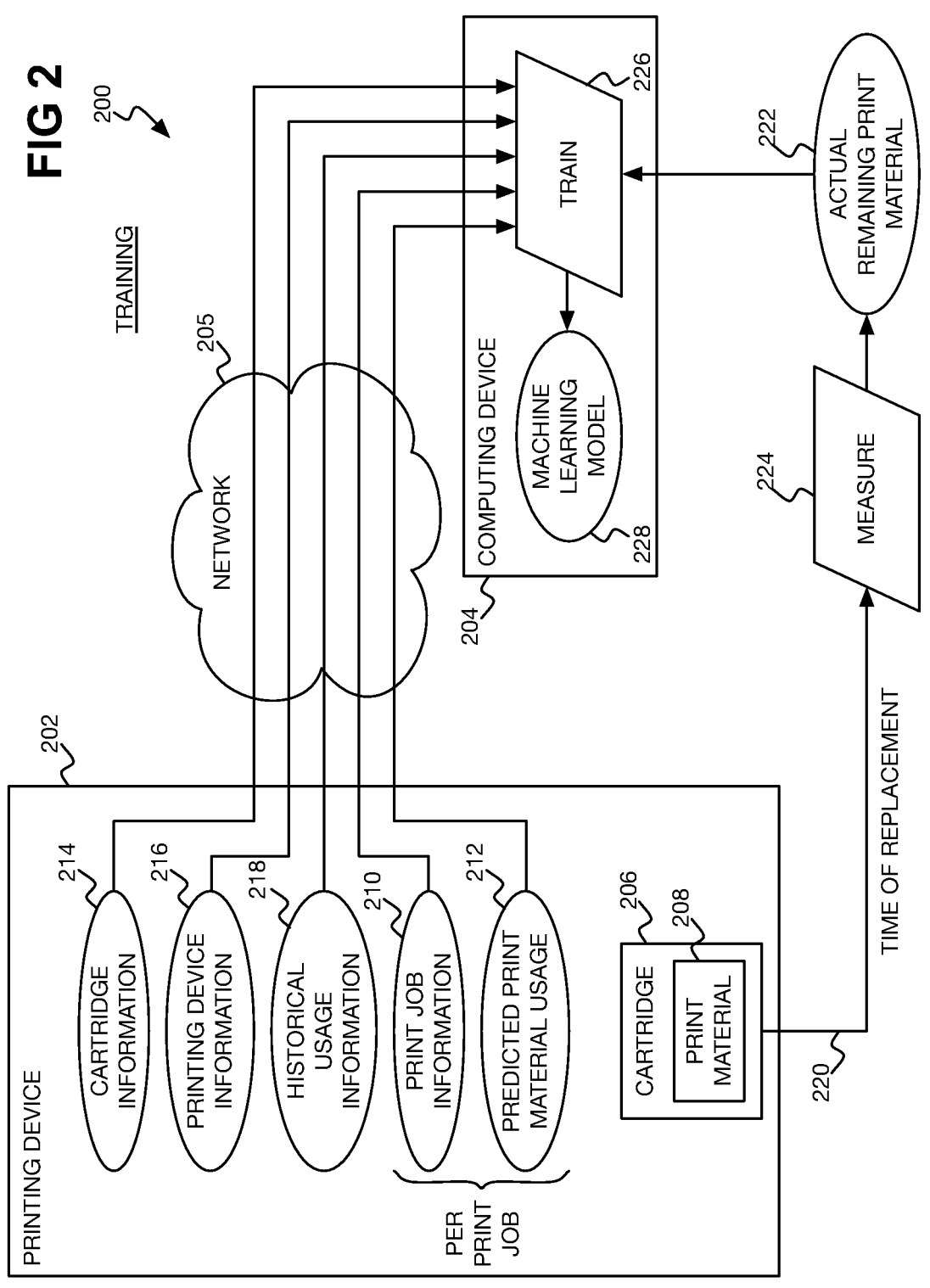
FIG. 2 is a diagram of an example system for training a machine learning model that provides a predicted print material usage correction factor for a print job.

FIG. 2 shows an example system 200 in the context of machine learning model training. The system 200 includes a printing device 202 and a computing device 204. The printing device 202 may be a standalone printer or an all-in-one (AIO) device (i.e., a multifunction printer, or MFP) that combines printing functionality with other functionality, such as scanning functionality. The computing device 204 may be a server, such as a cloud computing server, or another type of computing device. Just one printing device 202 is shown, but there can be more than one printing device 202 of the same or different models or types. The printing device 202 and the computing device 204 are communicatively connected to a network 205, such as wired or wireless networks, intranets, extranets, the Internet, and so on.

As depicted in FIG. 2, the printing device 202 may be directly connected to the network 205 without an intermediary host computing device like a desktop or laptop computer. For instance, the printing device 202 may include a wired network port, such as an Ethernet port, and/or may have wireless communication capability, such as Wi-Fi or another type of wireless local area network (WLAN) communication capability. In another implementation, however, the printing device 202 may be communicatively connected to a host computing device, such as via a universal serial bus (USB) wired connection or a Bluetooth wireless connection. In such an implementation, the host computing device is communicatively connected to the network 205, and the printing device 202 communicates over the network 205 through the host computing device.

The printing device 202 includes a cartridge 206 of print material 208 that the printing device 202 uses when printing jobs. The term cartridge as used herein includes any type of print material supply that can be connected to or installed within the printing device 202. For example, the cartridge may be a toner or an inkjet cartridge. As the printing device 202 prints print jobs, the printing device 202 can send to the computing device 204 print job information 210 and predicted print material usage 212 for each print job, as well as cartridge information 214, printing device information 216, historical usage information 218.

The printing device 202 can send the print job information 210 and the predicted print material usage 212 periodically (such as once or twice a day, and so on) in batches, for multiple print jobs that have been printed, or individually as each print job is printed. The printing device 202 may send the cartridge information 214 and the printing device 202 information each time the print job information 210 and the predicted print material usage 212 are sent, or just when a new cartridge 206 is installed within the device 202. The printing device 202 may send the historical usage information 218 each time the print job information 210 and the predicted print material usage 212 are sent, or just when the cartridge 206 has been replaced within the device 202.

The print job information 210 includes the information regarding a print job from which the predicted print material usage 212 of the print job is calculated. The print job information 210 may include continuous tone ("contone") information for each pixel of each page image of the print job. A print job can include a number of pages, which may be printed on corresponding print media sheets or sheet sides. Each page includes a rendered image, where any text of the page is rendered as an image, which is made up of pixels. The contone information of a pixel is a binary or grayscale value corresponding to how dark the pixel is. The predicted print material usage 212 is the amount of print material 208 used to print the print job. The predicted usage 212 may be calculated as a function of the print job information 210, for instance.

The cartridge information 214 can include the serial number, model number and date of manufacture, lot number, or other identifying information of the cartridge 206 including the print material 208 used to print the print jobs. While print material cartridges of the same type are nominally the same, manufacturing variability can occur over time, as different lots of cartridges are manufactured. Such manufacturing variability can affect how much print material 208 is actually used when printing a print job.

The printing device information 216 can similarly include the serial number, model number and date of manufacture, lot number, or other identifying information of the printing device 202, as well as other information like when the printing device 202 was first installed, deployed, or used. As with print material cartridges, while printing devices of the same type are nominally the same, manufacturing variability can occur over time, and such variability can affect how much print material 208 the printing device 202 uses when printing a print job. Likewise, as the printing device 202 ages, the amount of print material 208 the device 202 uses to print a print job may vary.

The printing device information 216 can further include the environmental conditions, such as temperature and/or humidity, of the printing device 202 when printing a print job. The environmental conditions can affect how much print material 208 the printing device 202 uses when printing the print job. The printing device information 216 can additional or instead include geolocational or other information from which the environmental conditions of the printing device 202 can be determined.

The historical usage information 218 can include the total number of pages that the printing device 202 has printed and/or that have been printed using the cartridge 206, the average length in pages of each print job, and other such information. The number of pages the printing device 202 has already printed can affect how much print material 208 the device 202 uses when printing a print job. Furthermore, a number of intermittently printed small print jobs may use more print material 208 than a large print job printed at one time and that encompasses the pages of the small jobs.

After the cartridge 206 has been replaced within the printing device 202 with a new cartridge (220), the actual remaining print material 222 within the cartridge 206 is measured (224) and provided to the computing device 204. For example, when the cartridge 206 is running low on print material 208, the printing device 202 may notify the computing device 204, which may cause shipment of a replacement cartridge. Upon replacement of the cartridge 206, the cartridge 206 may be returned for recycling. At the recycling or other facility, the remaining print material 222 may be removed from the cartridge 206 and measured, such as by being weighed and correlated to a number of pixels that could still have been printed using the remaining print material 212.

The computing device 204 can train (226) a machine learning model 228 from the information collected regarding a number of cartridges of print material as used in a number of different printing devices of the same or similar type. As such, the machine learning model 228 may be trained in part based on the print job information 210 and the predicted print material usage 212 for each print job printed using the print material 208 from the cartridge 206, as well the actual remaining print material 222 within the cartridge 206 after the cartridge 206 has been replaced within the printing device 202. The machine learning model 228 may further be trained in part based on the cartridge information 214, the printing device information 216, and the historical usage information 218 that has been received from the printing device 202.

Therefore, print job information 210 and predicted print material usage 212 of print jobs, among other information 214, 216, and/or 218, are collected for different cartridges 206 installed within different printing devices 206, and constitute training data for the machine learning model 228. When the cartridges 206 are replaced, their amounts of actual remaining print material 222 are measured and also become part of the training data. The resultantly trained machine learning model 228 can, from the print job information 210 and predicted print material usage 212 of a print job (among other information 214, 216, and/or 218), provide a correction factor that can be applied to the predicted usage 212 to become more accurate.

Figure 3:
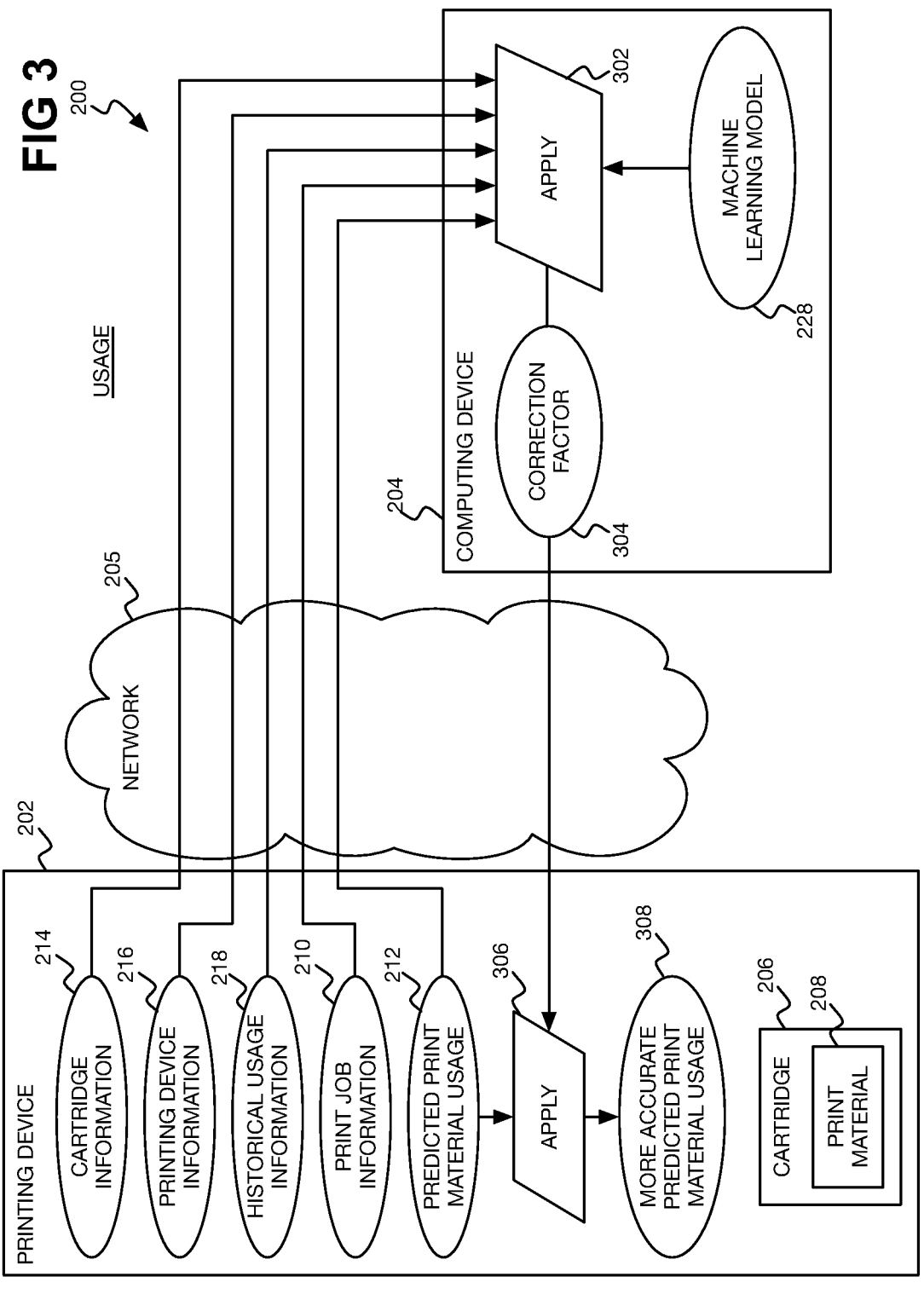
FIG. 3 is a diagram of an example system for using a machine learning model that provides a predicted print material usage correction factor for a print job.

FIG. 3 shows the example system 300 in the context of machine learning model usage. The printing device 202 may calculate the predicted usage 212 of print material 208 from the cartridge 206 when printing a print job, from the print job information 210 of the print job. The printing device 202 sends the print job information 210 and the predicted print material usage 212 of the print job over the network 205 to the computing device 204. The printing device 202 may also send the cartridge information 214, the printing device information 216, and/or the historical usage information 218, such as in the case in which the machine learning model 228 was previously trained with training data including such information 214, 216, and/or 218.

The computing device 204 applies (302) the machine learning model 228 to the received print job information 210 and predicted print material usage 212 of the print job (and also to the received information 214, 216, and/or 218 if such information was used during training) to determine a correction factor 304 for the print job. The computing device 204 sends the correction factor 304 over the network 205 to the printing device 202. The printing device 202 applies (306) the correction factor 304 to the predicted print material usage 212 to determine more accurate predicted material usage 308. The correction factor-applied predicted print material usage 308, in other words, more accurately reflects the actual print material usage of the print job.

The correction factor 304 may be a weight, for instance, by which the predicted print material usage 212 is multiplied. If the weight is less than one, then the actual print material usage of the print job (and thus the more accurate usage 308) is less than the predicted usage 212. If the weight is greater than one, then the actual print material usage (and thus the more accurate usage 308) is greater than the predicted usage 212 of the print job. The correction factor 304 may instead be a value that is added to the predicted print material usage 212, and which may be positive or negative to adjust the predicted usage 212 upwards or downwards in determining the more accurate usage 308.

The printing device 202 can thus more accurately track the remaining print material 208 within the cartridge 206 as print jobs are printed, even without directly measuring or otherwise monitoring the actual amount of print material 208 in the cartridge 206 or the amount of print material 208 used when printing any print job. When the printing device 202 indicates that the cartridge 206 should be replaced with a fresh print material cartridge when the cartridge 206 has run low or become depleted of print material 208 (as tracked by the device 202), less print material 208 is likely to remain in the cartridge 206. Usage of the trained machine learning model 228 can therefore reduce print material waste.

In another implementation, the computing device 204 applies the correction factor 304 to the predicted print material usage 212 to determine the more accurate predicted print material usage 308, instead of the printing device 202. The computing device 204 may or may not send the more accurate predicted print material usage 308 to the printing device 202. If the computing device 204 sends the more accurate predicted usage 308, the printing device 202 can more accurately track the remaining print material 208 within the cartridge 206 as before. If the computing device 204 does not send the more accurate predicted usage 308, the device 204 may itself more accurately track the remaining print material 208.

Figure 4A:
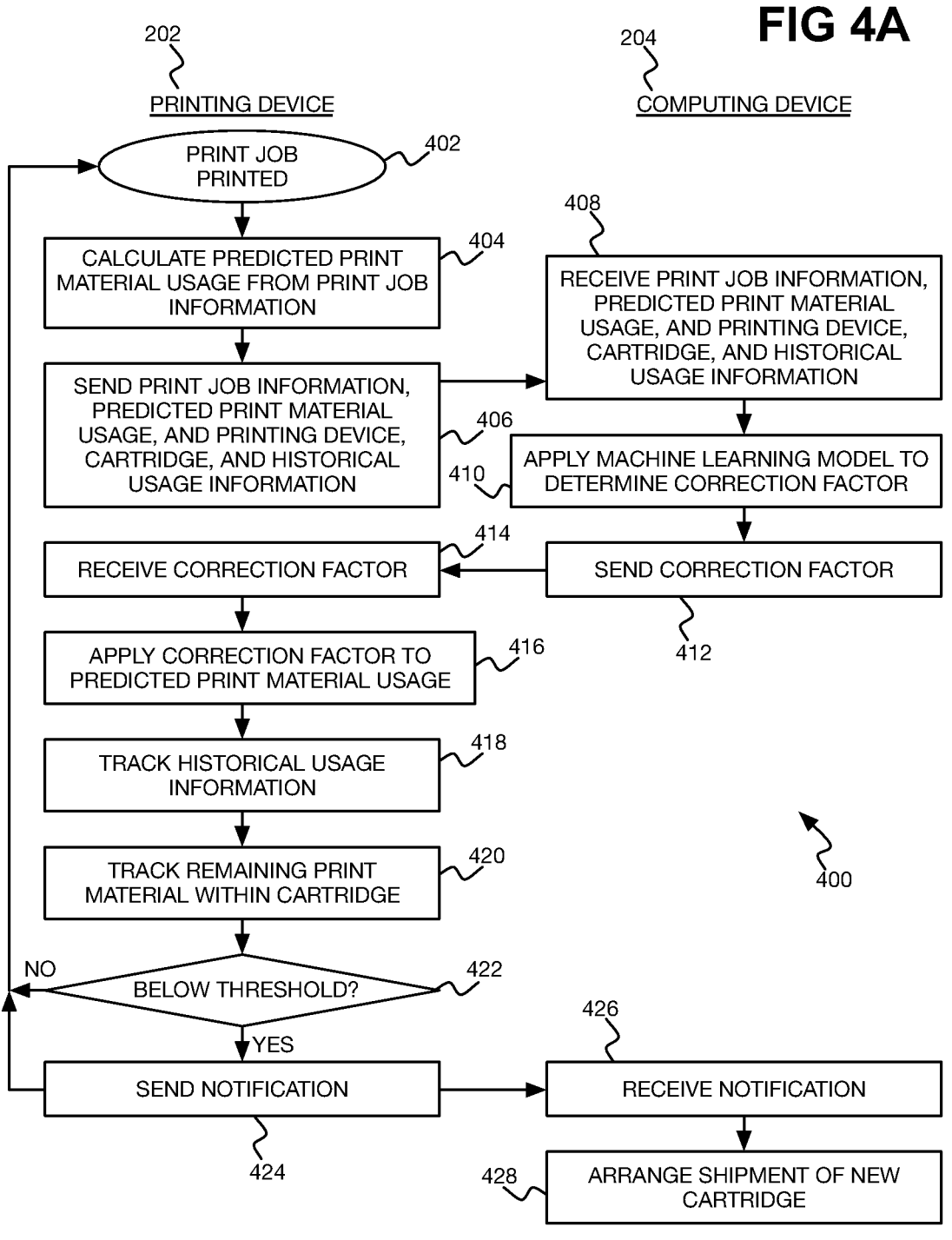
FIGS. 4A and 4B are flowcharts of different example methods for using a machine learning model that provides a predicted print material usage correction factor for a print job.
Figure 4B:
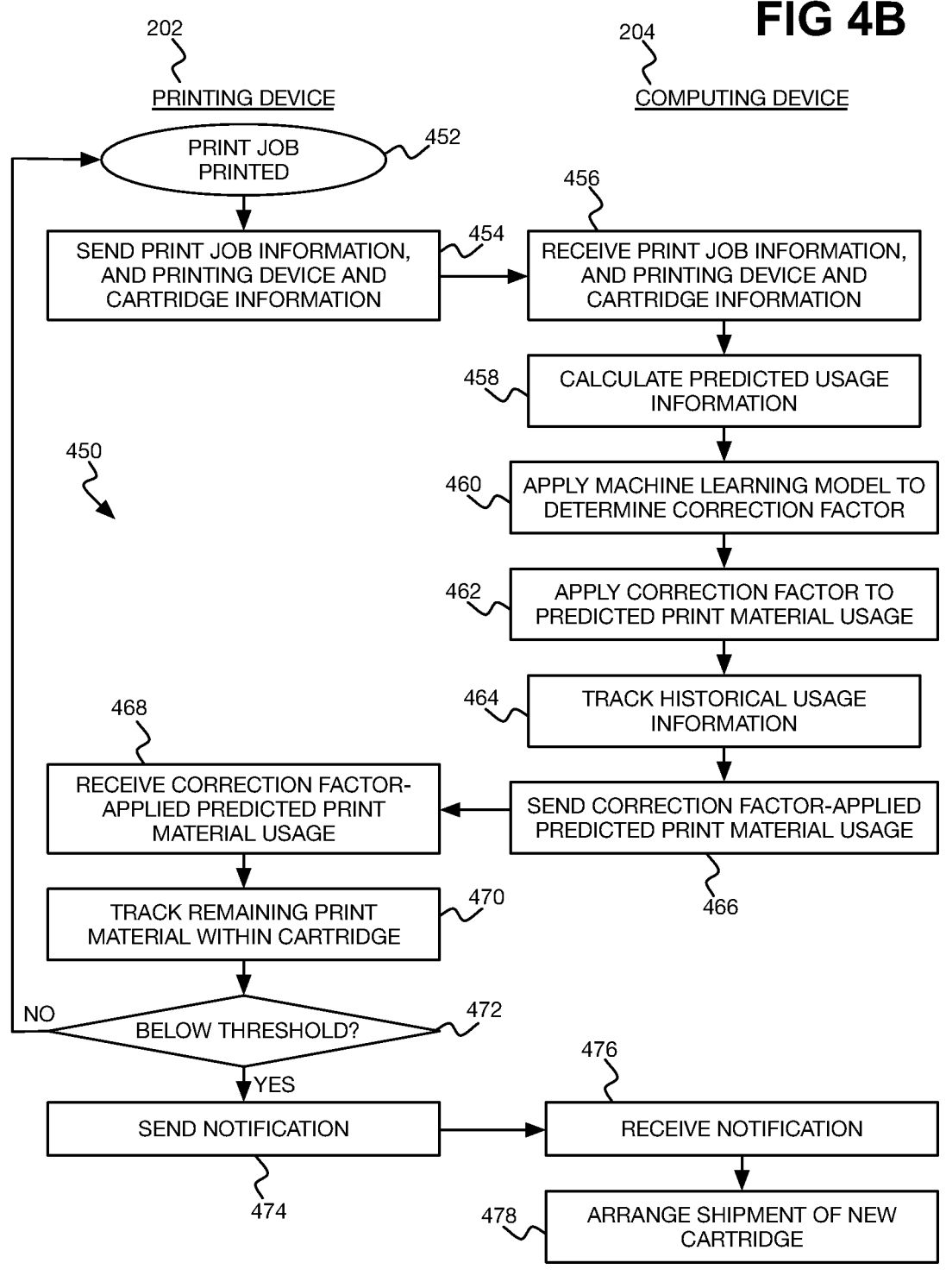

FIGS. 4A and 4B respectively show different example methods 400 and 450 for usage of the trained machine learning model 228. The left column of the methods 400 and 450 is performed by the printing device 202, and the right column is performed by the computing device 204. The left and right columns of the methods 400 and 450 may be implemented as program code stored on non-transitory computer-readable data storage media and executed by the devices 202 and 204, respectively.

In FIG. 4A, when a print job is printed at the printing device 202 (402), the printing device 202 calculates the predicted usage 212 of the print material 208 from the cartridge 206 from print job information 210 of the print job (404). The printing device 202 sends the print job information 210 and the predicted print material usage 212 of the print job to the computing device 204, and may also send cartridge information 214, printing device information 216, and/or historical usage information 218 if the machine learning model 228 was previously trained using such information 214, 216, and/or 218 (406). The computing device 204 thus receives the print job information 210 and the predicted print material usage 212 of the print job, as well as any other information 214, 216, and/or 218 that was sent (408).

The computing device 204 applies the trained machine learning model 228 to the received print job information 210 and the predicted print material usage 212 of the print job (and to any other received information 214, 216, and/or 218) to determine a correction factor 304 for the print job (410). That is, the print job information 210 and the predicted print material usage 212 (as well as any other received information 214, 216, and/or 218) are input into the machine learning model 228, and the model 228 responsively outputs the correction factor 304. The computing device 204 sends the correction factor 304 to the printing device 202 (412), which receives the correction factor 304 (414).

The printing device 202 applies the correction factor to the predicted print material usage 212 to determine more accurate predicted usage 308 of print material 208 from the cartridge 206 in having printed the print job (416). The printing device 202 can track the historical usage information 218 (418) by, for instance, updating the historical usage information 218 to take into the print job. For example, the number of print jobs printed by the printing device 202 may be incremented, as may the number of jobs printed using the print material 208 from the currently installed cartridge 206. The average length of each print job printed by the printing device 202 may be updated, as may the average length of each job printed using the print material 208 from the cartridge 206.

The printing device 202 can further track the remaining print material 208 within the cartridge 206 based on the more accurate predicted print material usage 308 of the print job (420). For example, the printing device 202 may subtract the more accurate predicted usage 308 from the tracked remaining print material 208. When the tracked remaining print material 208 falls below a threshold (422), the printing device 202 may send a notification to the computing device 204 (424), which receives the notification (426) and may accordingly arrange shipment of a new print material cartridge (428). (In another implementation, the new cartridge may be sent prior to a notification being received.) The printing device 202 can continue to print further print jobs using print material 208 from the currently installed cartridge 206 (402).

In FIG. 4B, when a print job is printed at the printing device 202 (452), the printing device 202 sends print job information 210 of the print job to the computing device 204, and may also send cartridge information 214 and/or printing device information 216 if the machine learning model 228 was previously trained using such information 214 and/or 216 (454). The computing device 204 thus receives the print job information 210, as well as any other information 214 and/or 216 that was sent (456). The computing device 204 (as opposed to the printing device 202 as in FIG. 4A) calculates the predicted usage 212 of the print material 208 from the cartridge 206 from the received print job information 210 (458).

The computing device 204 applies the trained machine learning model 228 to the received print job information 210 and the calculated print material usage 212 of the print job (and to any other received information 214 and/or 216 and/or historical usage information 218) to determine a correction factor 304 for the print job (460). The computing device 204 (as opposed to the printing device 202 as in FIG. 4A) applies the correction factor to the predicted print material usage 212 to determine more accurate predicted usage 308 of print material 208 from the cartridge 206 (462). The computing device 204 (as opposed to the printing device 202 as in FIG. 4A) may also track the historical usage information 218 (464).

The computing device 204 sends the correction factor 304-applied predicted print material usage 308 to the printing device 202 (466), which accordingly receives this more accurate predicted print material usage 308 of the print job (468). The printing device 202 can track the remaining print material 208 within the cartridge 206 based on the more accurate print material usage 308 (470). If the tracked remaining print material 208 is less than a threshold (472), the printing device 202 may send a notification to the computing device 204 (474), which receives the notification (476) and may accordingly arrange shipment of a new print material cartridge (478). (In another implementation, the new cartridge may be sent prior to a notification being received.) The printing device 202 can continue to print further print jobs using print material 208 from the currently installed cartridge 206 (452).

One difference between the methods 400 and 450 is therefore that the printing device 202 calculates the predicted print material usage 212 of a print job in the method 400, whereas the computing device 204 calculates the predicted usage 212 in the method 450. Another difference is that the printing device 202 tracks the historical usage information 218 in the method 400, whereas the computing device 204 does in the method 450. Other permutations of the methods 400 and 450 are possible as well. As one example, the computing device 204 may calculate the predicted print material usage 212 as in the method 450, whereas the printing device 202 may track the historical usage information 218 as in the method 400.

Figure 5:
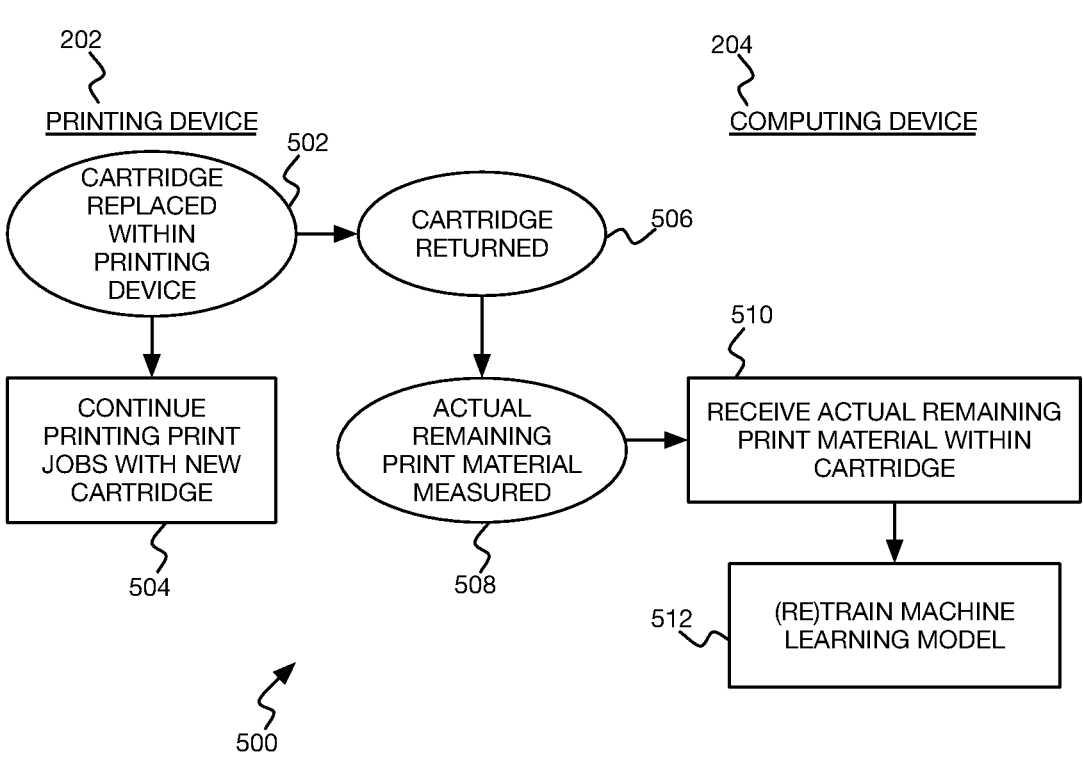
FIG. 5 is a flowchart of an example method for (re) training a machine learning model that provides a predicted print material usage correction factor for a print job.

FIG. 5 shows an example method 500 for (re) training of the machine learning model 228. The left column of the method 500 is performed by the printing device 202, and the right column is performed by the computing device 204. The left and right columns of the method 500 may be implemented as program code stored on non-transitory computer-readable data storage media and executed by the devices 202 and 204, respectively. The method 500 may be performed after the method 400 and/or 450 has been performed.

After the cartridge 206 has been replaced within the printing device 202 with a new print material cartridge (502), the printing device 202 can continue printing print jobs using the new cartridge (504), such as in accordance with the method 400 and/or 450. The removed cartridge 206 can be returned (506) so that the actual remaining print material 222 still within the cartridge 206 can be measured (508). The computing device 204 receives the actual remaining print material 222 (510), and can (re) train the machine learning model 228 based on the actual remaining print material 222, the previously received print job information 210 and the predicted print material usage 212 of each print job printed with the cartridge 206, and any other received information 214, 216, and/or 218.

For instance, once print job information 210, predicted print material usage 212, and actual remaining print material 222 (and any other information 214, 216, and/or 218) have been received for a sufficient number of cartridges 206 and from a sufficient number of printing devices 202, the machine learning model 228 may be initially trained. Thereafter, the machine learning model 228 may be periodically retrained as additional print job information 210, predicted print material usage 212, and actual remaining print material 222 (and any other information 214, 216, and/or 218) is received for additional cartridges 206 and/or from additional printing devices 202. Periodic retraining can result in the machine learning model 228 becoming more accurate over time.

The machine learning model 228 has been described as outputting a correction factor 304 to be applied to the predicted print material usage 212 of a print job to determine more accurate print material usage 308. The machine learning model 228 may instead output the more accurate print material usage 308 itself, instead of a correction factor 304. In this case, the machine learning model 228 is still considered as determining and providing a correction factor 304, but the correction factor 304 is internally determined and provided (and applied to the predicted print material usage 212) internally within the model 228 and may not be output from the model 228.

FIG. 6 shows an example method 600. The method 600 includes receiving print job information of print jobs printed by printing devices using print material from cartridges, and predicted print material usage by the printing devices in printing the print jobs, on a per-print job basis (602). (In one implementation, each image that is printed may be considered a separate print job, where for one-sided printing one image is printed on each media sheet, and where for two-sided printing one image is printed on each side of each media sheet.) The method 600 includes measuring actual remaining print material within the cartridges after the cartridges have been replaced within the printing devices by new cartridges (604). The method 600 includes training, based on the received print job information, the received predicted print material usage, and the measured actual remaining print material, a machine learning model that provides a correction factor to the predicted print material usage on the per-print job basis (606).

FIG. 7 shows an example non-transitory computer-readable data storage medium 700 storing program code 702 executable by a processor of a computing device to perform processing. The processing includes receiving, from a printing device, print job information of a print job printed by the printing device using print material from a cartridge (704). The processing includes applying a machine learning model to the received print job information and predicted print material usage by the printing device in printing the print job to determine a correction factor to apply to the predicted print material usage to determine more accurate predicted print material usage of the print job (706). The processing includes sending, to the printing device, the determined correction factor for the print job or the more accurate predicted print material usage of the print job (708).

FIG. 8 shows an example printing device 800. The printing device 800 includes network hardware 802 to communicatively connect to a computing device over a network. The printing device 800 includes printing hardware 804 to print a print job on print media using print material from a cartridge. For instance, the printing hardware 804 may include laser-printing hardware components such as a photoconductive drum, an optical beam source, a fuser, and so on, or may include inkjet-printing hardware components such as an inkjet printhead.

The printing device 800 includes logic hardware 806. The logic hardware 806 may be or include a processor and a non-transitory computer-readable data storage medium storing program code executable by the processor. The processor and the medium may be discrete components as is the case with a general-purpose processor and a memory, or may be integrated as one component as is the case with an application-specific integrated circuit (ASIC). The logic hardware 806 sends print job information of the print job to the computing device (808). The logic hardware responsively receives from the computing device a correction factor to apply to predicted print material usage of the print job to determine more accurate predicted print material usage, or the more accurate predicted print material usage of the print job (810).

Techniques have been described that provide a machine learning model for more accurately predicting the usage of print material by a printing device when printing a print job. The machine learning model is trained based on print job information and predicted print material usage of print jobs printed by printing devices using print material from cartridges, as well as the actual remaining print material within the cartridges when they are replaced within the printing devices, among other information. The techniques can decrease the amount of print material that remains within the cartridges when they are replaced within the printing devices, and thus reduce print material waste.

We claim:

1. A method comprising:

receiving, by a processor of a computing device, print job information of print jobs printed by printing devices using print material from cartridges, and predicted print material usage by the printing devices in printing the print jobs, on a per-print job basis;

receiving, by the processor, actual remaining print material within the cartridges measured after the cartridges have been replaced within the printing devices by new cartridges;

training, by the processor and based on the received print job information, the received predicted print material usage, and the received actual remaining print material, a machine learning model that provides a correction factor to the predicted print material usage on the per-print job basis;

receiving, by the processor and from a printing device, print job information and predicted print material usage of a print job printed by the printing device using print material from a cartridge already used to print one or more other print jobs, wherein the predicted print material usage is determined by the printing device;

applying, by the processor, the machine learning model to the received print job information and the received predicted print material usage to determine the correction factor for the print job; and sending, by the processor, the correction factor to the printing device, wherein the printing device applies the predicted print material usage to determine more accurate predicted print material usage, such that the printing device determines the more accurate predicted print material usage.

2. The method of claim 1, wherein the print job information is received from the printing devices periodically in batches or as the print jobs are printed.

3. The method of claim 1, further comprising:

receiving printing device information regarding the printing devices and cartridge information regarding the cartridges, wherein the machine learning model is further trained based on the received printing device information and the received cartridge information.

4. The method of claim 1, further comprising:

receiving historical usage information regarding the print jobs printed by the printing devices using the print material from the cartridges, wherein the machine learning model is further trained based on the received historical usage information.

5. The method of claim 1, wherein the print job information of each print job comprises continuous tone information for each of a plurality of pixels of each of a plurality of page images of the print job, wherein the predicted print material usage is calculated from the continuous tone information.

6. A non-transitory computer-readable data storage medium storing program code executable by a processor to perform processing comprising:

receiving, from a printing device, print job information and predicted print material usage of a print job printed by the printing device using print material from a cartridge, wherein the predicted print material usage is determined by the printing device;

applying a machine learning model to the received print job information and the predicted print material usage by the printing device in printing the print job to determine a correction factor to apply to the predicted print material usage to determine more accurate predicted print material usage of the print job; and sending, to the printing device, the determined correction factor for the print job, wherein the printing device applies the determined correction factor to the predicted print material usage, such that the printing device determines the more accurate predicted print material usage.

7. The non-transitory computer-readable data storage medium of claim 6, wherein the processing further comprises, after replacement of the cartridge within the printing device by a new cartridge:

receiving measured actual remaining print material within the cartridge; and retraining the machine learning model based on the received print job information, the predicted print material usage, and the received measured actual remaining print material.

8. A printing device comprising:

network hardware to communicatively connect to a computing device over a network;

printing hardware to print a print job on print media using print material from a cartridge; and logic hardware to:

calculate predicted print material usage based on print job information of the print job printed by the printing hardware;

send the predicted print material usage and the print job information to the computing device;

responsively receive a correction factor from the computing device, wherein the computing device determines the correction factor by applying a machine learning model to the predicted print material usage and the print job information; and apply the correction factor to the predicted print material usage to determine more accurate predicted print material usage of the print job.

9. The printing device of claim 8, wherein the logic hardware is to further:

track remaining print material within the cartridge as print jobs are printed, based on correction factor-applied predicted print material usage of each print job; and send a notification to the computing device when the tracked remaining print material is less than a threshold.

* * * * *